United States Patent
Amitai

[19]

[11] Patent Number: 5,825,523
[45] Date of Patent: Oct. 20, 1998

[54] LINEAR BEAM STEERING DEVICE

[76] Inventor: Yaakov Amitai, 2 Moholiver Street, Rehovot 76304, Israel

[21] Appl. No.: 545,238

[22] Filed: Oct. 19, 1995

[30] Foreign Application Priority Data

Oct. 25, 1994 [IL] Israel ........................................ 111392

[51] Int. Cl.⁶ .............................. G02B 26/08; G02B 5/18
[52] U.S. Cl. .......................... 359/209; 359/569; 359/575; 359/900
[58] Field of Search .............................. 359/17, 565, 566, 359/569, 575, 197, 209, 900; 235/457; 356/401; 250/237 G

[56] References Cited

U.S. PATENT DOCUMENTS

| | | | |
|---|---|---|---|
| 3,980,389 | 9/1976 | Huignard et al. | 359/17 |
| 4,091,281 | 5/1978 | Willhelm et al. | 359/566 |
| 4,106,844 | 8/1978 | Bryngdahl et al. | 359/17 |
| 5,162,656 | 11/1992 | Matsugu et al. | 356/401 |
| 5,448,403 | 9/1995 | Harris | 359/565 |
| 5,495,336 | 2/1996 | Nose et al. | 356/401 |

FOREIGN PATENT DOCUMENTS

| | | | |
|---|---|---|---|
| 58-216221 | 12/1983 | Japan | 359/566 |
| 02-240619 | 9/1990 | Japan | 359/17 |
| 02-281226 | 11/1990 | Japan | 359/17 |

OTHER PUBLICATIONS

Henry H.M. Chau, "Moiré Pattern Resulting From Superposition of Two Zone Plates", *Appl. Optics*, vol. 8, No. 8, Aug. 1969, pp. 1707–1712.

*Primary Examiner*—Paul M. Dzierzynski
*Assistant Examiner*—John Juba, Jr.
*Attorney, Agent, or Firm*—Edwin D. Schindler

[57] ABSTRACT

A device for linear beam steering, where a translation of one grating respective the other one results in an increased angular deviation of the light beam. The device includes at least one pair of gratings with parallel lines, different from each other, and each according to a different mathematical formula, spaced at a certain distance parallel one below the other, the spacing of lines in each of the gratings increases from one edge to the other. There can be provided a plurality of such "facets" of gratings arranged one after the other. The double design is compact, inexpensive and essentially aberration free, it has many applications such as scanners for laser range finders, dynamic aiming systems, laser printers and plotters, and many more.

12 Claims, 6 Drawing Sheets

LINEAR BEAM STEERING DEVICE

BACKGROUND OF THE INVENTION

In many optical systems it is required to perform an angular scanning of a plane wave over a wide field of view, or to perform linear scanning of a focused beam on a plane. A few examples are: An angular scanner for a Laser-Radar, where the transmitted narrow beam should cover a solid angle much wider than the angular divergence of the beam; aiming systems where the central aiming point is moving as a function of the target range and velocity; linear scanners for laser printers or plotters and more. In the existing systems, beam steering is performed with conventional optical elements such as a polygonal mirror or a pair of prisms. These suffer from some drawbacks: The scanning unit is relatively large and heavy and limits the performance of systems which are required to be compact; mass production is quite expensive; the scanning rate is severely limited by the mechanical system, and rotating systems usually suffer from wobble which must be restrained in order to allow accurate scanning. As a result, there is a need for a compact, inexpensive, accurate, and simple beam steering device with a high scanning rate.

Recently there have been made several proposals to perform beam steering by microlens array translation—with either diffractive or refractive lenses [see for example: W. Goltsos and M. Holtz, "Agile beam steering using binary optics microlens arrays", Optical Engineering 29, 1392–1397 (1990)]. Unfortunately, these approaches usually suffer from high aberrations at small f-numbers, and they must rely on fairly complicated and costly equipment, which often limits the performance of the microlens arrays.

1. SUMMARY OF THE INVENTION

The present invention relates to a method to fulfill the required beam steering with two diffractive elements, having one-dimensional chirped grating functions, where a linear translation of one grating respective to the other causes an angular deviation on the output beam. This system is relatively small, compact and simple. The design procedure is general and flexible for various system's parameters. It is an important feature of the invention that a very large deviation coefficient can be attained, of the order of 10 rad/mm, so that, for example, with a minute linear translation of a few tenths of a micron it is possible to significantly deviate the output beam. As a result, the translation of the grating can be accomplished with a small piezo-electric crystal, and there is no need for complicated translating or rotating mechanism.

According to the simplest embodiment the device comprises two "facets" each of which having a plurality of parallel lines the spacing of which increases from one end of the edge to the other according to different mathematical formulae, and where the arrangement of the lines in the second grating is in the same direction as that of the first one, as can be shown in FIG. 1a. These are arranged at a constant distance from each other and one can be displace laterally respective the other.

According to another embodiment the device comprises of two "facets" each of which having a plurality of parallel lines, the spacing of which increases from one end of the edge to the center according to different mathematical formulae, and then decreases to the other end in a symmetrical manner, and where the arrangement of the lines in the second grating is in the same direction as that of the first one, as can be shown in FIG. 1b.

According to another embodiment the device comprises of a plurality of facets pairs, as described in the first embodiment above (FIG. 1c).

According to another embodiment the device comprises of a plurality of facets pairs, as described in the second embodiment above (FIG. 1d).

In all of these the gratings are at a constant distance from each other. The invention is illustrated with reference to the enclosed schematical Figures, which are not according to scale, and in which:

FIGS. 1a, 1b, 1c, and 1d illustrate some possible embodiments of the device: FIG. 1a is an example of the simplest embodiment wherein the device comprises the basic facets of the invention; FIG. 1b is an example of another embodiment wherein the device comprises symmetrical facets; FIG. 1c is an example of another embodiment wherein the device comprises a plurality of facets pairs, each of which are illustrated in FIG. 1a; and FIG. 1d is an example of another embodiment wherein the device comprises a plurality of facets pairs, each of which are illustrated in FIG. 1b;

FIGS. 2a and 2b illustrate ray tracing output when passing through two gratings of the invention, FIG. 2a illustrating the wave before translation of the grids, FIG. 2b after translation of Grid $G_1$ by $\delta x$;

FIGS. 3a and 3b, respectively, illustrate ray tracing of a ray impinging on $\xi_1$ (a) before and after (b) translation of the grid $G_1$ by $\delta x$;

2. DESIGN ANALYSIS

Figure 1A:
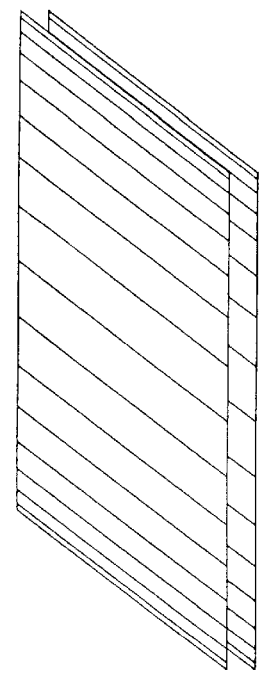
Figure 1B:
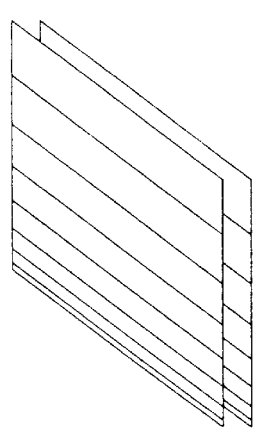
Figure 1C:
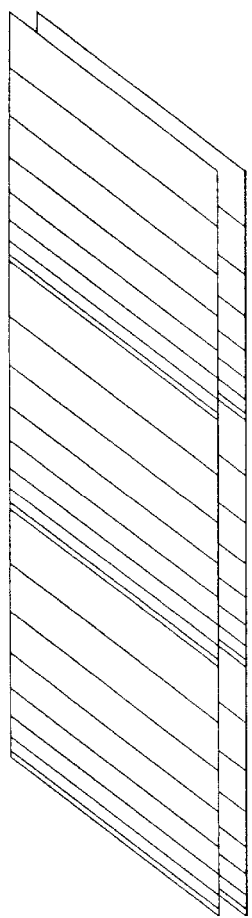
Figure 1D:
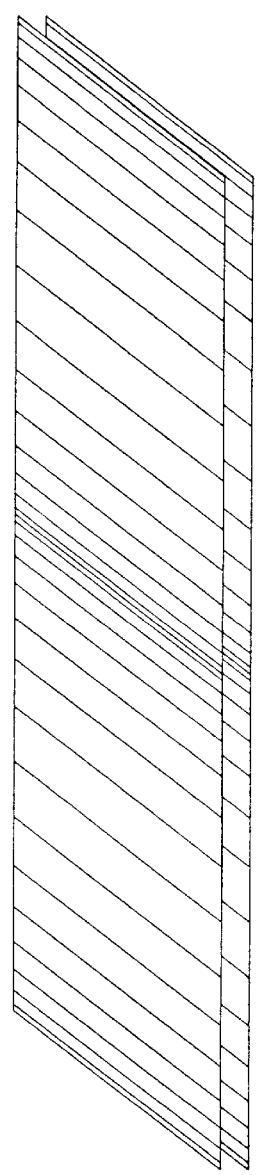
Figure 2B:
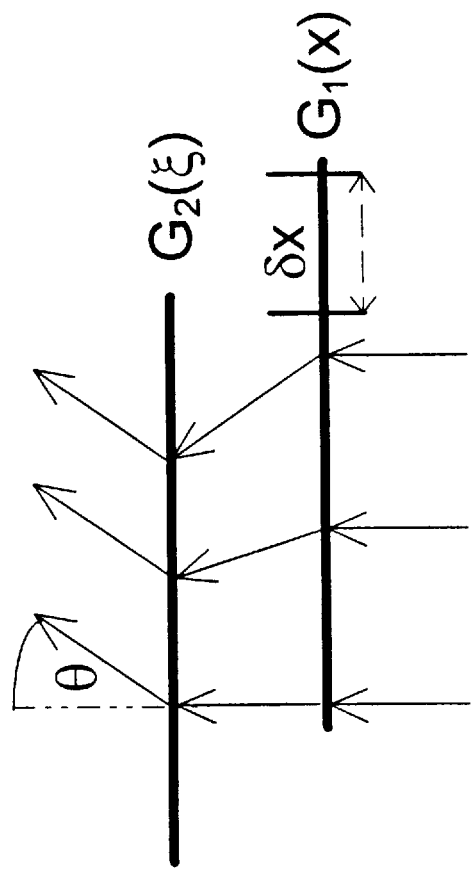
Figure 2A:
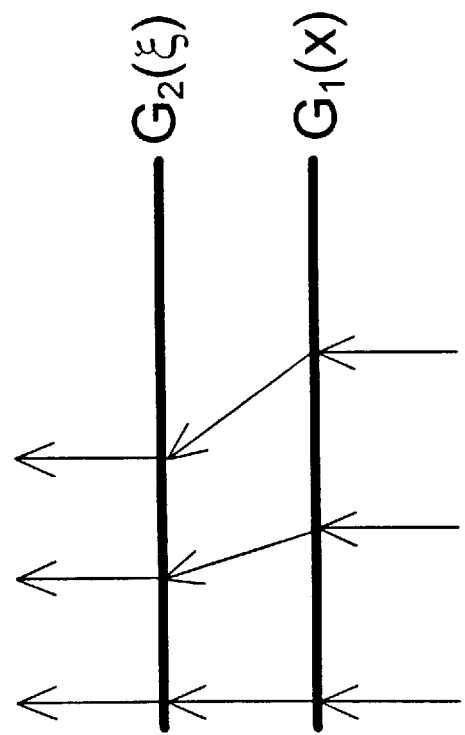

The novel system, shown in FIG. 2, is based on two parallel gratings, $G_1$ and $G_2$, having one-dimensional grating functions $\phi_1(x)$ and $\phi_2(\xi)$, respectively. The distance between the gratings, d, is constant, and the input wave impinges on the first grating, $G_1$, normal to the grating plane. As shown in FIG. 2, with no translation, the output wave emerges from the second grating, $G_2$, normal to the grating plane. However, when $G_1$ is translated by $\delta x$, the output wave is deviated by an angle $\theta$, where the deviation ratio, $\kappa = \delta \sin \theta / \delta x$, is a constant. Hence, a continuous linear translation of $G_1$ induces a continuous angular steering of the output wave. This angular steering can be easily converted into linear scanning of a focused beam by means of an appropriate converging lens.

2.1 Calculating the Grating Function $\phi_1(x)$ of $G_1$

Figure 3B:
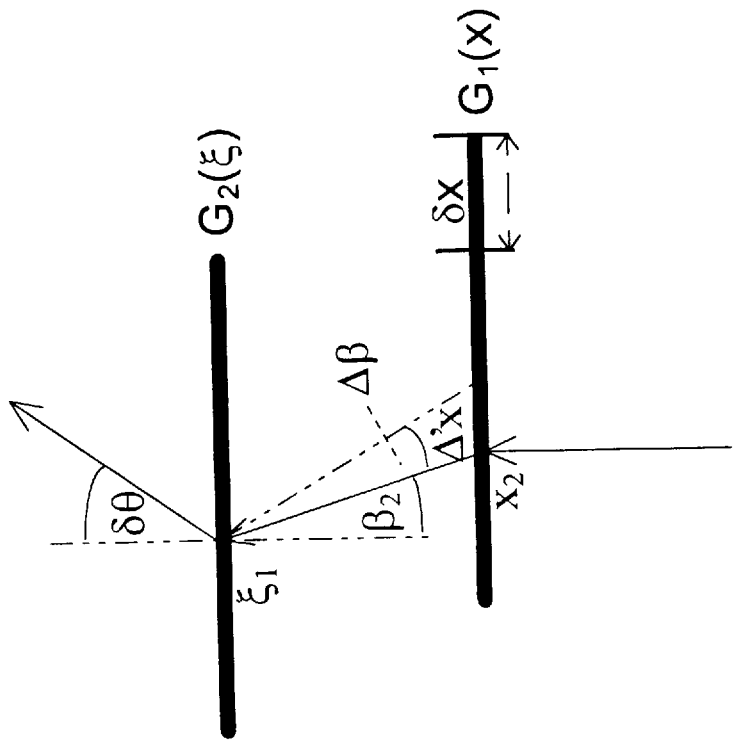
Figure 3A:
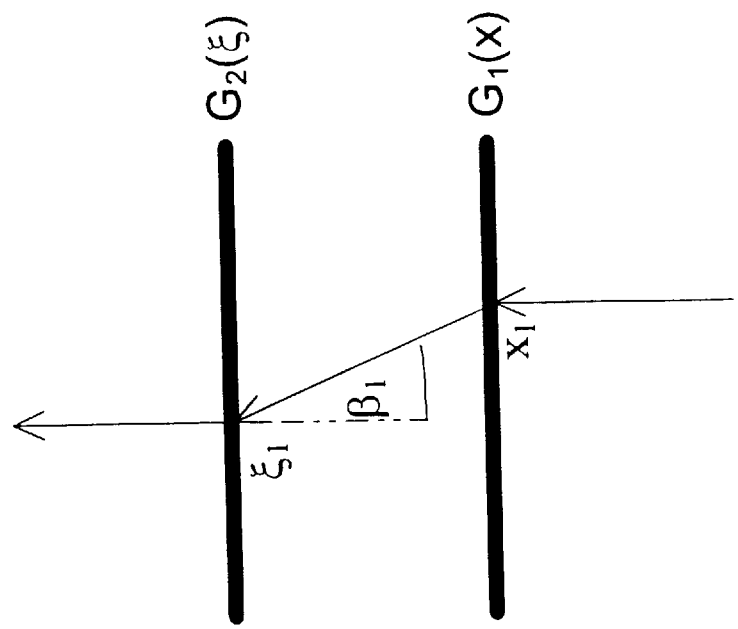

Before the translation of $G_1$, the ray which impinges on $\xi_1$ arrives from $x_1$, where x and $\xi$ are the lateral coordinates of the gratings $G_1$ and $G_2$, respectively. After the translation of $G_1$, the ray which impinges on $\xi_1$ arrives from $x_2$. The total movement $\Delta x = x_2 - x_1$ is given by the linear translation of the grating $G_1$ by $\delta x$, plus the change $\Delta' x$ which is caused by the fact that the ray which impinges on $x_2$ arrives at $G_2$ from a different direction (see FIG. 3). Hence, the total change is $$\Delta x = -(\Delta' x + \delta x) \qquad (1)$$

The minus sign is because a rightward translation of $G_1$ causes a leftward movement of $x_2$, and vice versa.

It is easy to find that $\Delta'x$ is approximately $$\Delta'x \approx \frac{-\Delta\beta}{\cos^2\beta_1} \cdot d \qquad (2)$$

where $\beta$ is the off-axis angle from $G_1$, and d is the distance between $G_1$ and $G_2$. From now on, all the length units will be normalized to d≡1, hence $$\Delta'x'25 \frac{-\Delta\beta}{\cos^2\beta(x)} . \qquad (3)$$

The grating function $\phi(x)$ for $G_1$ is defined as $$\phi(x) = \frac{2\pi}{\lambda} \cdot \sin\beta(x) \qquad (4)$$

where $\lambda$ is the readout wavelength. We assume that $G_1$ is readout with a monochromatic wave, and to simplify the following equations we omit the term $\lambda/2\pi$, therefore $$\phi(x) = \sin\beta(x). \qquad (5)$$

The relation between the angular deviation $\Delta\beta$ and the deviation in the grating function $\Delta\phi$ is $$\Delta\beta \approx \frac{\Delta\phi}{\cos\beta} \qquad (6)$$

Inserting Eqs. (3) and (6) into Eq. (1) yields $$\Delta r \approx -\left(\frac{\Delta\phi}{\cos^3\beta} + \delta x\right) \qquad (7)$$

It is easy to see that in our case $$\Delta\phi = \sin\beta_2 - \sin\beta_1 = \Delta\sin\theta = \delta\theta \qquad (8)$$

Hence, dividing Eq. (7) by $\Delta\phi$ and inserting the result into Eq. (8) yields $$\frac{\Delta x}{\Delta\phi} \approx -\left(\frac{1}{\cos^3\beta} + \frac{\delta x}{\delta\theta}\right) \qquad (9)$$

By defining the constant $$\delta = \frac{\delta x}{\delta\theta}$$

and assuming an infinitesimal translation of $\delta x$, it is possible to get to following differential relation:

$$dx = -d\phi \cdot \left(\frac{1}{(1-\phi^2)^{\frac{3}{2}}} + \delta\right) \qquad (10)$$

It is clear from Eq. (5) that $\cos\beta(x) = \sqrt{1-\phi^2}$. The solution of the differential equation is $$x = -\left(\frac{\phi}{\sqrt{1-\phi^2}} + \delta \cdot \phi\right) + C_0 \qquad (11)$$

where $C_0$ is the integration constant which is found from the boundary condition ($\phi(0)=0$) to be $C_0=0$. Hence, the relation between the grating function $\phi(x)$ and the lateral coordinate x of $G_1$ is given by the implicit equation $$x(\phi) = -\left(\frac{\phi}{\sqrt{1-\phi^2}} + \delta \cdot \phi\right) \qquad (12)$$

or in another form $$x(\phi) = -(\tan\beta(x) + \delta \cdot \sin\beta(x))$$

This is a simple monotonic function, and, therefore, we can easily find the inverse function $\phi = \phi(x)$.

2.2 Calculating the Grating Function $\psi(\xi)$ of $G_2$

The coordinate $\xi(x)$ of $G_2$ is given (where $\delta(x) = 0$) by $$\xi = x + \tan\beta(x). \qquad (13)$$

Inserting Eq. (12) into Eq. (13) yields $$\xi = -(\tan\beta + \delta\sin\beta) + \tan\beta = -\delta\sin\beta(\xi) \qquad (14)$$

For $\delta(x)=0$, the output wave from $G_2$ is normal to the grating plane, hence, the grating function of $G_2$ is $$\psi(\xi) = -\sin\beta(\xi) \qquad (15)$$

Inserting Eq. (15) into Eq. (14) yields $$\xi = -\delta\sin\beta(\xi) = \delta \cdot \psi(\xi) \qquad (16)$$

Now, the grating function of $G_2$ is given by an explicit form:

$$\psi(\xi) = \frac{\xi}{\delta} \qquad (17)$$

2.3 The Accuracy of the Functions $\phi(x)$ and $\psi(\xi)$

Despite the few trigonometric approximations which were done in Eqs. (2)–(17), since we made the integration of Eq. (10) in a case where $\delta x$ is infinitesimal, all the calculations became accurate and the grating functions $\phi(x)$ and $\psi(x)$ are now exact. In addition, an inverse calculation, where $\psi(x)$ is calculated first and than $\phi(x)$, yields exactly the same solutions.

To verify this analytic design, a large number of computer simulations with different deviation relations $\kappa$ were performed (as defined above $-\kappa=1/\delta$), $\phi$ in the ranges from $\kappa=10$ Rad/mm to $\kappa=0.01$ Rad/mm. In all these simulations we find that the output wave, over the entire dynamic range of the scanner, is a diffraction limited plane wave without any aberrations.

2.4 Design Limitations

Equation (16) can be rewritten as $$\sin\beta(\xi) = -\frac{\xi}{\delta} \qquad (18)$$

Since $\sin\beta(\xi) <$ there is a limiting condition on $\delta$:

$$\delta > \xi_{max}. \qquad (19)$$

Figure 4:
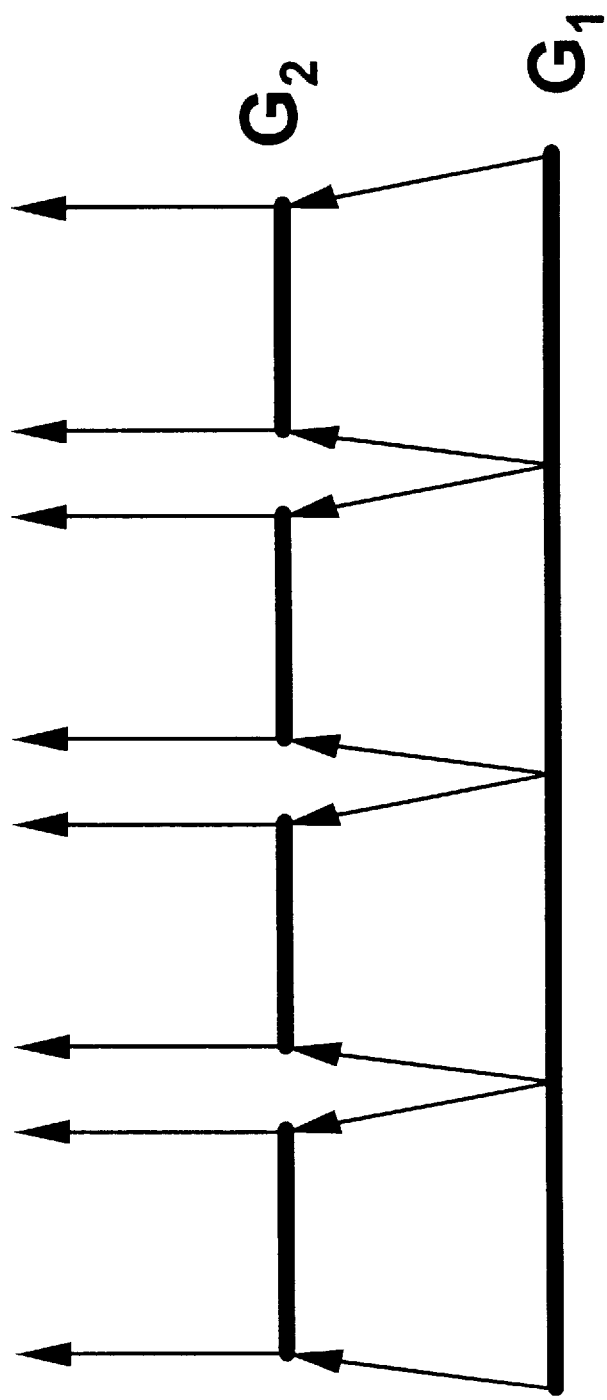
FIG. 4 illustrates an array of identical grating couples.

Usually, we want $\delta$ as small as possible (minor translation of $G_1$ which causes a significant deviation of the output wave). Hence, for a given $\delta$, there is a limitation on $\xi_{max}$. For systems where we need both small $\delta$ and large grating's area, this limitation might be overcame by assembling an array of n identical gratings, given by $$G_1 = \sum_{i=1}^{n} G_1^i; G_2 = \sum_{i=1}^{n} G_2^i \qquad (20)$$

where $G_k^j = G_k^i$ for $\leq i,j \leq n$ and $k=1,2$. For all $\leq i \leq n$ the grating $G_1^i$ is constructed in relation to $G_2^i$ according to the process described above (see FIG. 4).

There are still some difficulties associated with this solution. Since the lateral edge of $G_2$ is smaller than of $G_1$, there are spaces between the elements $G_2^i$, hence, there will be a problem of parasite diffraction from this "pseudo-grating". To reduce this effect, it is desired that the ratio $D_1/D_2$ will be larger than 0.8, where $D_1$ and $D_2$ are the linear extent of $G_1^i$ and $G_2^i$, respectively.

Let's examine the practical meaning of this constraint; when the length of $G_2^i$ is $\xi_{max}$ the length of $G_1^i$ is:

$$x_{max} \cong \xi_{max} + \frac{\xi_{max}}{\delta} \quad (21)$$

The requirement that $x_{max} \geq \xi_{max} \geq 0.8 \cdot x_{max}$ yields the constraint $$\delta \geq 4. \quad (22)$$

As was described above, $\delta$ is defined as: $\delta = \delta x/\delta\theta$ where the system is normalized for d=1. Substituting d again yields the condition $$.\delta x_{max} \geq 4 \cdot d \cdot \delta\theta_{max} \quad (23)$$

Generally, the ratio between the areas of the gratings and the total number of facets in the arrays will be set as an optimum according to the specific requirements of the system.

3. Detailed Description of the Invention

The invention is described by way of illustration only with reference to the following examples, which is illustrative only. The invention is illustrated by the following system having the following parameters:

$\lambda = 0.6328\ \mu m;\ d = 1\ cm;\ \delta\theta_{max} = 0.75°;\ \delta = 4.$ Inserting these parameters into Eq. (23) yields $$x_{max} = 0.25\ cm \quad (24)$$

Since every grating in the array is symmetric around the y axis, we get the lateral size of each facet to be $$W = x_{max} - (-x_{max}) = 0.5\ cm \quad (25)$$

3.1 Calculating the Desired Grating Functions

The grating function of $G_1$ is defined implicitly in Eq. (12)

$$x(\phi) = -\left(\frac{\phi}{\sqrt{1-\phi^2}} + \delta \cdot \phi\right)$$

where $\phi = \sin\beta(x)$. In order to easily manufacture this grating, it is preferable to define this function explicitly. To achieve this, the above function was expanded to a power series, to get $\sin\beta(x)$ explicitly. The result of this expansion, using only the first three non-vanishing terms, yields:

$$\sin\beta(x) = \frac{-x}{(1+\delta)} + \frac{0.5 \cdot x^3}{(1+\delta)^4} - \frac{0.375 \cdot (1-\delta) \cdot x^5}{(1+\delta)^7} + L \quad (26)$$

The calculation for $G_2$ is easier, since Eq. (18) yields $\sin\beta(\xi) = \xi/\delta$ explicitly. A large number of simulations, with various parameters, were performed, where the explicit form of Eq. (26) replaced the implicit form of (12). All these simulations reveal that there is no practical change in the functions (the most significant change was in the order of $10^{10}$) or in the performance of the system, which remained diffraction limited.

It is now possible to calculate the distances between two neighboring fringes, in $G_1$ and $G_2$ respectively, to be $$D_1(x) = \frac{\lambda}{\sin\beta(x)} \quad (27)$$

$$D_2(\xi) = \frac{\lambda}{\sin\beta(\xi)} \quad (28)$$

Inserting the system parameters and Eq. (26) into Eq. (27) yields $$D_1(x) = \left|\frac{0.6328}{0.2 \cdot x - 8 \cdot 10^{-4} \cdot x^3 - 1.44 \cdot 10^{-5} \cdot x^5}\right| \quad (29)$$

For $-0.25\ cm \leq x \leq 0.215\ cm$ where x is given in cm and D in $\mu m$. The minimal distance between the fringes is 12.5 $\mu m$.

Inserting the system parameters and Eq. (17) into Eq. (28) yields $$D_2(x) = \left|\frac{40 \cdot .6328}{\xi}\right| \quad (30)$$

For $-0.25\ cm \leq \xi \leq 0.25\ cm$ where $\xi$ is given in cm and D in $\mu m$. The minimal distance between the fringes is 10 $\mu m$.

3.2 Experimental Test of the Gratings

Figure 5:
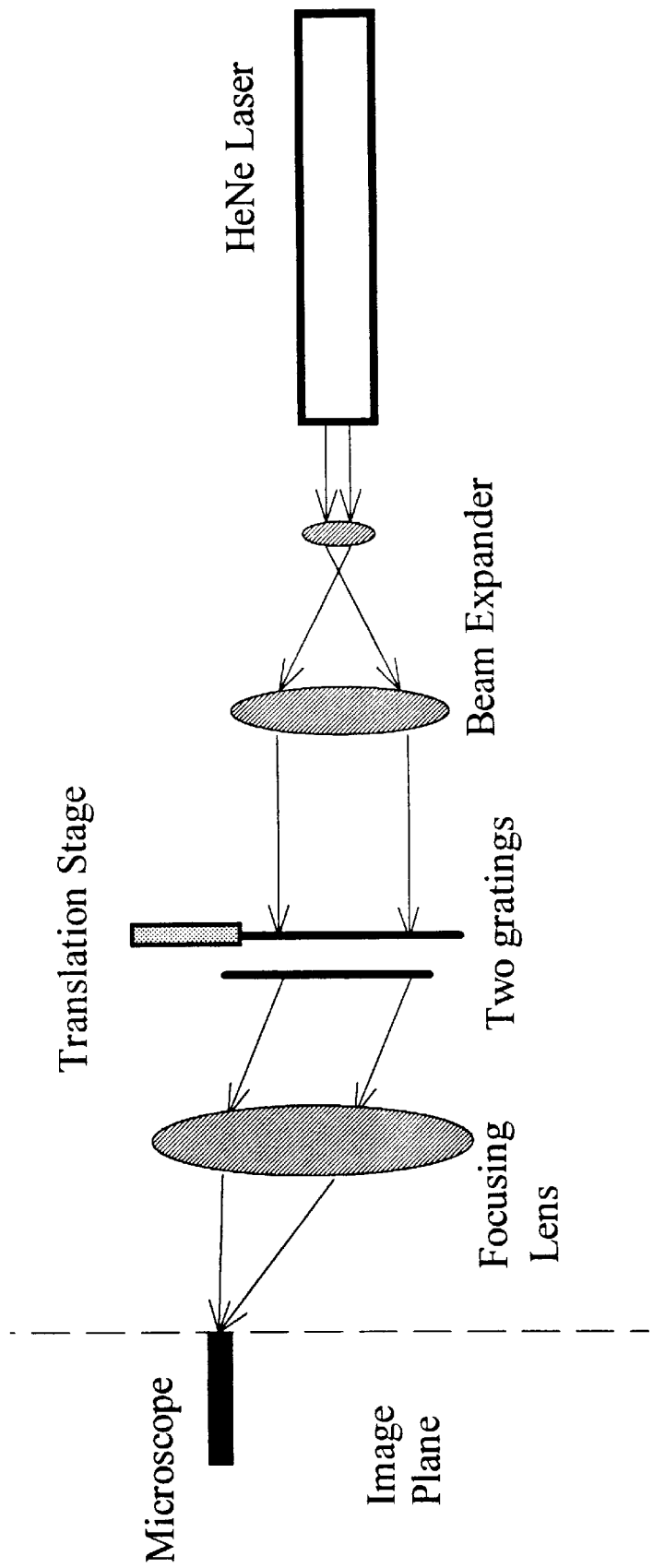
FIG. 5 is a schematic side view, in partial section of an experimental set-up according to the invention.

The desired gratings were manufactured by direct writing method with the Dolev plotter. FIG. 5 demonstrates the experimental test setup.

As can be seen in the figure, the light source is a HeNe laser. The output beam is expanded by a beam expander into a plane wave which impinges of $G_1$. This grating is attached to a micro-translation stage, and can be translated parallel to the grating's plane. After passing the second grating, the output wave is focused by a appropriate lens with a focal length of f=40 cm into the image plane, where the spot size and the exact focal position are checked by a microscope.

The results show that over the entire field of view the spot size is ~7 $\mu m$, which is a diffraction-limited spot size. As Expected, the location of each focal point was at a distance of $$\delta l = \frac{f \cdot \delta x}{\delta} = 10 \cdot \delta x \quad (31)$$

from the zero point, defined as the focal point for $\delta x = 0$. The experimental results reveal that there is a magnification in the lateral displacement of the focal point, i.e., a linear translation of $G_1$ by $\delta x$, causes a linear translation of the focal point, larger by a factor of $f/\delta$. Since $\delta$ is normalized to d, the lateral magnification can be increased significantly by decreasing d accordingly.

4. Concluding Remarks

According to one aspect, the present invention relates to a method for designing a linear beam steerer, based on the use of a double chirped grating. The predicted and the experimental properties of the design agree, including a high lateral translation magnification and a diffraction-limited performance. The novel doublet design offers a compact, cheap, and aberration-free system, which has many applications, such as: an angular scanner for laser range-finders, dynamic aiming systems, linear scanners for laser printers or plotters and more. Its relatively simple fabrication process and analytical design procedure make it appropriate for mass production while facilitating retooling to meet different requirements.

Figure 6:
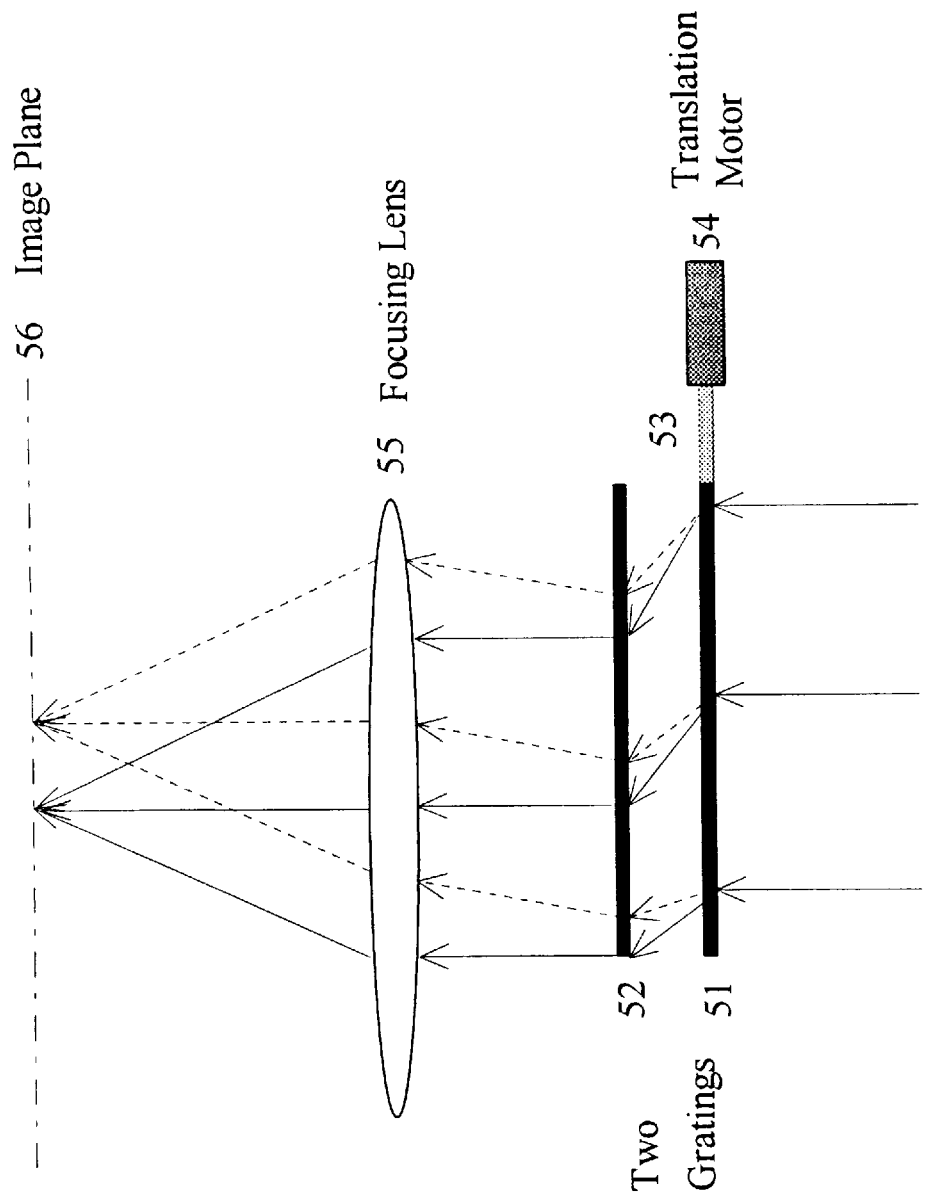
FIG. 6 is an illustration of the conversion of a plane wave to a linear point scanner by means of a focusing lens.

As shown in FIG. 6, there are provided two gratings, 51 and 52, parallel with each other at a distance 53, where grating 51 can be moved in its plane respective grating 52 by translation motor 54. There is provided a focusing lens 55 at a certain distance from grating 52 with its focus at imaging plane 56. The angular steering of the plane wave is converted by this focusing lens into a linear scanning of a point. Each plane wave, corresponding to a different translation of the first grating 51, is focused by the focusing lens 55 onto the image plane 56 where the foci of the various plane waves are laterally displaced along a straight line.

Amongst applications of this device there may be mentioned linear scanners for laser printers, beam scanners for bar-code readers, mask plotters for use in the lithography industry, laser beam scanners for CD-ROM readers.

It is clear that the above description is by way of illustration only and that there exist many variations and modifications within the scope of the present invention.

A process for putting into effect the present invention comprises the following steps:

Determining the various parameters of the system which are the distance between the two gratings $G_1$ and $G_2$, determining the deviation ratio $\delta = \delta x/\delta\theta$, defining the operating wavelength $\lambda$ and the maximal deviation angle $\delta\theta_{max}$.

Calculating according to equations (12) and (17) and the above parameters, the grating functions $\phi(x)$ and $\psi(\xi)$ of the gratings $G_1$ and $G_2$, respectively.

Calculating according to equation (23) the lateral size of each facet, $W=2*x_{max}$, according to the parameters of step 1.

Determining the number of facets in each grating according to the aperture of the input beam.

Manufacturing the respective gratings by conventional production techniques, assembling the gratings at a predetermined distance from each other, with means for laterally moving one of the gratings respective the other by suitable means, so that such lateral movement results in a predetermined deviation of the beam.

I claim:

1. A device for linear beam steering comprising:
   a pair of parallel gratings, located at a constant distance from each other, said pair of parallel gratings being different, each of said parallel gratings comprising a plurality of parallel lines, wherein the spacing between the lines gradually increases from one edge of the grating up to a maximum distance between the lines, and wherein the arrangement of lines in a second grating of said parallel gratings is in the same direction as that of a first grating, each of said parallel gratings comprising at least one such spacing sequences, and means for a continuous lateral displacement of one of said parallel gratings respective the other of said parallel gratings thereby resulting in a large angular deviation of an output beam passing through the two parallel gratings, wherein a grating function, $\phi(x)$, for a first grating $G_1$, of said two parallel gratings is calculated by the equation:

$$\phi(x) = \phi'(x) + C_0$$

wherein $C_0$ is a constant and $\phi'(x)$ is given by the implicit equation:

$$x(\phi') = -\left(-\frac{\phi'}{\sqrt{1-\phi'^2}} + \delta \cdot \phi'\right)$$

and wherein a grating function, $\psi(\xi)$, for a second grating, $G_2$, of said two parallel gratings is calculated by the equation:

$$\psi(\xi) = \frac{\xi}{\delta} + C$$

wherein,
   $0 \leq x \leq a$ and $0 \leq \xi \leq a$ are lateral coordinates of said two parallel gratings $G_1$ and $G_2$, respectively;
   a is a constant;
   $\delta$ is the ratio between the linear translation of $G_1$ and the angular deviation of an output wave;
   the distance between $G_1$ and $G_2$ is normalized to 1;

C is a constant; and,
   a plurality of said parallel grating pairs are arranged one after another.

2. A device according to claim 1 comprising a plurality of grating pairs, arranged one after the other.

3. A device according to claim 1 where each of the gratings having a plurality of parallel lines, the spacing of which increases from one end of the edge to the the center according to different mathematical formulae, and then decreases to the other end in a symmetrical manner, and where the arrangement of the lines in the second grating is in the same direction as that of the first one, and where a plurality of such gratings pairs arranged one after another.

4. A device according to claim 1, where $-\alpha \leq x \leq \alpha$ and $-\alpha \leq \xi \leq \alpha$ are the lateral coordinates of the gratings $G_1$ and $G_2$, and $\alpha$ is a constant.

5. A device according to claim 1, wherein $\kappa$, where $\kappa = 1/\delta$ permits deviations in the range from $\kappa = 20$ Rad/mm to $\kappa = 0.01$ Rad/mm.

6. A device according to claim 1, with which comprises a plurality of grating pairs arranged one after the other.

7. A device according to claim 1, comprising means for the controlled movement of the grating respective the other by distances in the micron range.

8. A process for producing a linear beam steering system having two parallel optical gratings, wherein one of the parallel optical gratings is moved laterally to the other optical grating, said process comprising the steps of:

(a) determining parameters for the linear beam steering system which include determining a distance between the two parallel optical gratings, $G_1$ and $G_2$, determining a deviation ratio, $\delta = \delta x/\delta\theta$, defining an operating wavelength, $\lambda$, and a maximal deviation angle, $\delta\theta_{max}$;

(b) calculating the grating function, $x(\phi)$, of said parallel optical grating, $G_1$, according to the following equation:

$$x(\phi) = -\left(\frac{\phi}{\sqrt{1-\phi^2}} + \delta \cdot \phi\right)$$

(c) calculating the grating function, $\psi(\xi)$, of said parallel optical grating, $G_2$, according to the following equation:

$$\psi(\xi) = \frac{\xi}{\delta}$$

(d) calculating, according to the equation:

$$\delta x_{max} \geq 4 \cdot d \cdot \delta\theta_{max}$$

a lateral size of each facet, $w = 2*x_{max}$, according to the parameters of step (a);
   determining the number of facets in each grating according to an aperture of an input beam;
   manufacturing the two parallel optical gratings, $G_1$ and $G_2$;
   assembling the two parallel optical gratings, $G_1$ and $G_2$, at a predetermined distance from each other; and,
   providing means for continuously laterally moving, at least, one of the two parallel optical grating, $G_1$ and $G_2$, relative to each other, so that such continuous lateral movement causes a predetermined angular deviation of an output beam passing through said linear beam steering system.

9. The process according to claim 8, wherein the two parallel optical gratings are produced by direct writing.

10. The process according to claim 8, wherein said two parallel optical gratings are produced by microlithography.

11. The process according to claim 8, wherein said two parallel optical gratings are produced by holographic recording.

12. The process according to claim 8, further comprising the step of positioning a focusing lens in front of one of said two parallel optical gratings, thereby resulting in a point scan at an imaging plane defined by the focus of said focusing lens.

* * * * *